US012640877B2

(12) United States Patent
Rupasinghe et al.

(10) Patent No.: US 12,640,877 B2
(45) Date of Patent: May 26, 2026

(54) METHODS OF CSI-RS BEAMFORMING IN ANGLE-DELAY DOMAINS FOR TYPE II PORT SELECTION CODEBOOK

(71) Applicants: NTT DOCOMO, INC., Tokyo (JP); DOCO-MO INNOVATIONS, INC., Palo Alto, CA (US)

(72) Inventors: Nadisanka Rupasinghe, Tokyo (JP); Haralabos Papadopoulos, Tokyo (JP); Yuki Matsumura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 475 days.

(21) Appl. No.: 18/014,430

(22) PCT Filed: Sep. 15, 2021

(86) PCT No.: PCT/US2021/050490
§ 371 (c)(1),
(2) Date: Jan. 4, 2023

(87) PCT Pub. No.: WO2022/060855
PCT Pub. Date: Mar. 24, 2022

(65) Prior Publication Data
US 2023/0261832 A1 Aug. 17, 2023

Related U.S. Application Data

(60) Provisional application No. 63/145,779, filed on Feb. 4, 2021, provisional application No. 63/078,725, filed on Sep. 15, 2020.

(51) Int. Cl.
H04B 7/0456 (2017.01)
H04B 7/06 (2006.01)
(Continued)

(52) U.S. Cl.
CPC ......... *H04L 5/0051* (2013.01); *H04B 7/0626* (2013.01); *H04B 7/06956* (2023.05); *H04B 7/088* (2013.01)

(58) Field of Classification Search
None
See application file for complete search history.

(56) References Cited

U.S. PATENT DOCUMENTS 10,374,678 B2 * 8/2019 Lee ........................ H04L 5/0048
2020/0028555 A1 1/2020 Rahman et al.
(Continued)

FOREIGN PATENT DOCUMENTS

CN 110999368 A 4/2020
WO 2020017912 A1 1/2020

OTHER PUBLICATIONS

3GPP TS 38.214 V16.2.0, "3rd Generation Partnership Project; Technical Specification Group Radio Access Network; NR; Physical layer procedures for data (Release 16)" Jun. 2020 (163 pages).
(Continued)

*Primary Examiner* — Minh Trang T Nguyen
(74) *Attorney, Agent, or Firm* — Osha Bergman Watanabe & Burton LLP

(57) ABSTRACT
A terminal is disclosed that includes a receiver that receives beamforming information relating to one or more beamformed Channel State Information—Reference Signals (CSI-RSs), the CSI-RSs corresponding to one or more Spatial Domains (SDs) or Frequency Domains (FDs). The terminal also includes a processor that determines a type of the one or more CSI-RSs, and when the type of the one or more CSI-RS is a Type II, performs a Type II port selection codebook with a beamformed CSI-RS of the one or more CSI-RSs in the SD and FD domains.

3 Claims, 8 Drawing Sheets

100

Core Network — 30

35

20

S1

CSI-RSs

S2

10

CSI Feedback that Includes
Leading Coefficient Number K
for Subband Amplitude Reporting

(51) Int. Cl.
*H04B 7/08* (2006.01)
*H04L 5/00* (2006.01)

(56) References Cited

U.S. PATENT DOCUMENTS

| | | | |
|---|---|---|---|
| 2020/0367083 A1 | 11/2020 | Hao et al. | |
| 2021/0391910 A1* | 12/2021 | Wu | H04B 7/0639 |
| 2021/0409991 A1* | 12/2021 | Park | H04L 5/0057 |
| 2023/0131045 A1* | 4/2023 | Huang | H04L 5/0023 |
| | | | 375/267 |

OTHER PUBLICATIONS

International Search Report issued in PCT/US2021/050490 on Feb. 28, 2022 (4 pages).

Written Opinion of the International Searching Authority issued in PCT/US2021/050490 on Feb. 28, 2022 (12 pages).
Samsung; "New WID: Further enhancements on MIMO for NR"; 3GPP TSG RAN Meeting #86, RP-193133; Sitges, Spain; Dec. 9-12, 2019 (14 pages).
Office Action issued in Japanese Application No. 2023-517252, mailed May 14, 2024 (9 pages).
Samsung: "Views on Rel. 17 CSI enhancements"; 3GPP TSG RAN WG1#102-e, R1-2006134; e-Meeting, Aug. 17-28, 2020 (7 pages).
Office Action issued in Chinese Patent Application No. 202180053845.5, issued Apr. 18, 2025 (14 pages).
Office Action issued in Japanese Patent Application No. 2024-209237, mailed on Sep. 9, 2025 (6 pages).
Office Action issued in European Patent Application No. 21791121.3, dated Sep. 29, 2025 (14 pages).
Japanese Office Action issued in Japanese Patent Application No. 2024-209237, dated Feb. 3, 2026 (5 pages).

* cited by examiner

FIG. 1
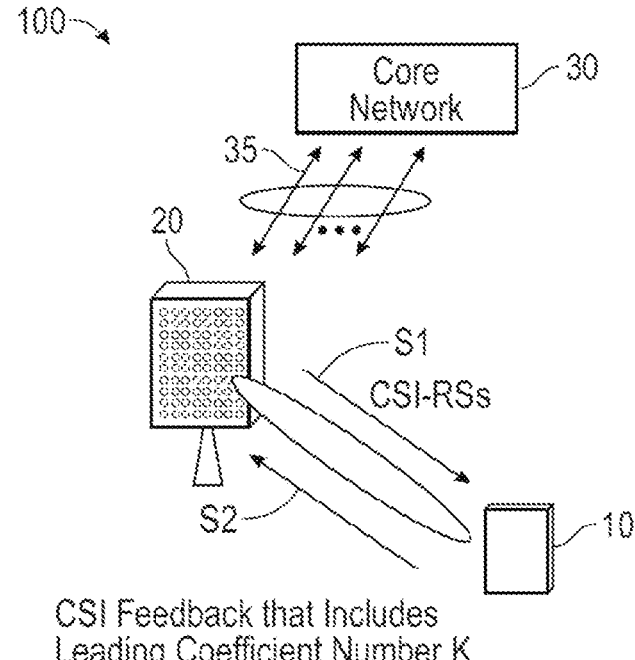
CSI Feedback that Includes
Leading Coefficient Number K
for Subband Amplitude Reporting
FIG. 2
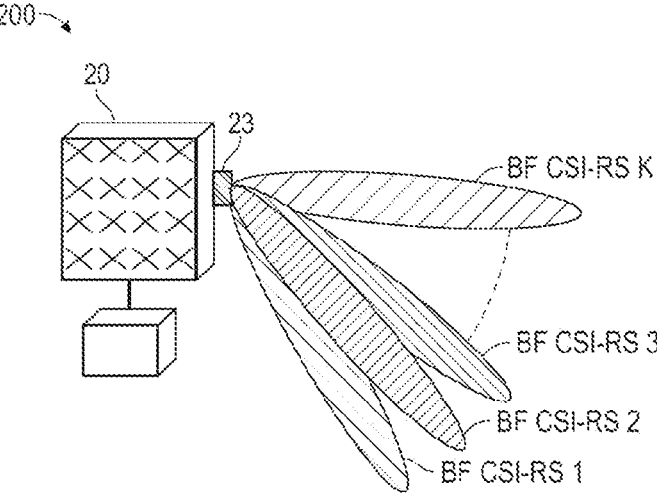
FIG. 2

FIG. 4

$$\begin{bmatrix} 0100000 \\ 0010000 \\ 0000000 \\ 0000100 \\ 0000010 \\ 0000000 \\ 0000000 \\ 0000000 \\ 0000000 \\ 0000000 \end{bmatrix}$$

1$^{st}$ SD Beam
2$^{nd}$ SD Beam

4$^{th}$ SD Beam
5$^{th}$ SD Beam

FIG. 5

Precoder for 1$^{st}$ polarization $\Rightarrow$

Precoder for 2nd polarization $\Rightarrow$ $$\begin{pmatrix} \sum_{i=1}^{L} c_i \boldsymbol{b}_{s(i)} \boldsymbol{f}_{s(i)}{}^{H} \\ \sum_{i=1}^{L} c_{i+L} \boldsymbol{b}_{s(i)} \boldsymbol{f}_{s(i)}{}^{H} \end{pmatrix} \quad (4)$$

FIG. 6

Precoder for 1$^{st}$ polarization $\Rightarrow$

Precoder for 2$^{nd}$ polarization $\Rightarrow$ $$\begin{pmatrix} \sum_{i=1}^{L} c_i \bar{\boldsymbol{b}}_{s(i)} \\ \sum_{i=1}^{L} c_{i+L} \bar{\boldsymbol{b}}_{s(i)} \end{pmatrix} \quad (5)$$

FIG. 7

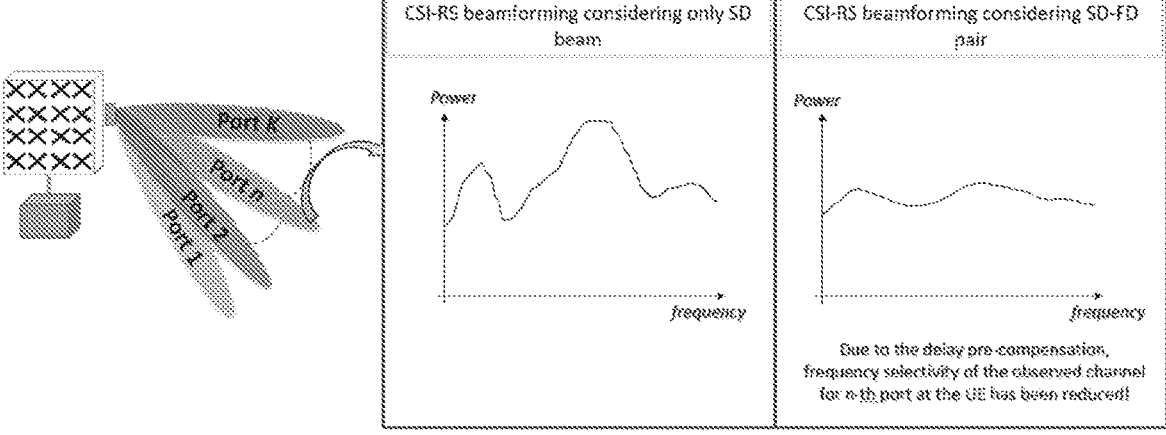

FIG. 8

Precoder for 1$^{st}$ polarization $\Rightarrow$

Precoder for 2$^{nd}$ polarization $\Rightarrow$ $$\left( \begin{array}{c} \sum_{i=1}^{L} \bar{b}_{s(i)} \sum_{j=1}^{M_{v}} c_{i,j} \tilde{f}_{s(j)}^{H} \\ \sum_{i=1}^{L} \bar{b}_{s(i)} \sum_{j=1}^{M_{v}} c_{i+L,j+L} \tilde{f}_{s(j)}^{H} \end{array} \right) \quad (6)$$

FIG. 9

Precoder for 1$^{st}$ polarization $\Rightarrow$

Precoder for 2$^{nd}$ polarization $\Rightarrow$ $$\left( \begin{array}{c} \sum_{i=1}^{L} \bar{b}_{s(i)} \sum_{j=1}^{M_{v}} c_{i,j} \tilde{f}_{s(j)}^{H} \\ \sum_{i=1}^{L} \bar{b}_{s(i)} \sum_{j=1}^{M_{v}} c_{i+L,j+L} \tilde{f}_{s(j)}^{H} \end{array} \right) \quad (7)$$

FIG. 13

$$\overline{N}_3$$

$$f_1 \quad f_2 \quad \boxed{f_3 \quad f_4 \quad f_5 \quad f_6} \quad f_7 \quad f_8 \quad f_9 \quad f_{10} \; \text{-----------}$$

Starting position, $M_{init}$

METHODS OF CSI-RS BEAMFORMING IN ANGLE-DELAY DOMAINS FOR TYPE II PORT SELECTION CODEBOOK

TECHNICAL FIELD

One or more embodiments disclosed herein relate to a device and a method for performing beamforming in angle-delay domains.

BACKGROUND

New Radio (NR) supports Type II channel state information (CSI) feedback for rank 1 and rank 2 (Release 15 of NR). In the Type II CSI feedback, an amplitude scaling mode is configured.

In the amplitude scaling mode, a user equipment (UE) may be configured to report a wideband (WB) amplitude with subband (SB) amplitude and SB phase information. In the conventional scheme, considerable fraction of the total overhead may be occupied by overhead for the SB amplitude and phase reporting. The equation below shows the SB precoder generation in NR Release 15 Type II CSI for single layer transmission.

$$W = W_{space} W_{coeff} \tag{1}$$

Here, the matrix W ($N_t \times N_{SB}$) captures precoding vectors for $N_{SB}$ sub-bands. $N_t$ denotes a number of available TXRU ports. $W_{space}(N_t \times 2L)$ consists of a 2L wideband spatial 2D-Discrete Fourier Transform (DFT) beams. The matrix captures the SB combination coefficients as represented in (1) by $W_{coeff}$. The SB amplitude and phase information that need to be reported are captured by $W_{coeff}$.

Further, the NR supports Type II CSI reporting for precoding downlink transmissions on a Physical Downlink Shared Channel (PDSCH). In this regard, Type II solutions focus on providing detailed CSI for the purposes of Multi-User Multiple-Input Multiple-Output (MIMO). In NR Release 15, these solutions support a maximum Rank of 2 corresponding to a maximum of 2 layers per UE (i.e., hereinafter referred to as terminal or device). In NR Release 15, 2×2 MIMO offers two spatial streams of wirelessly transmitting and receiving data on the same channel or frequency. For this implementation, a maximum number of layers per cell is higher compared to previous releases to allow multiple UE to use 2×2 MIMO simultaneously while sharing a common Resource Block allocation. Type II reports are based upon selecting a set of beams and then specifying relative amplitudes and phases to generate a weighted combination of beams for each layer of transmission. As such, Type II Port Selection solution relies on a Base Station having some advance information to allow beamforming of the CSI Reference Signal (RS) transmissions. This advance information can originate from uplink measurements if channel reciprocity is available. Otherwise it can originate from Beam Management reports or it can use wideband reports from different Precoding Matrix Indicator (PMI) reporting solutions (i.e., a hybrid solution is when a combination of PMI reporting solutions is used).

In NR, the majority of parameters associated with PMI reporting are configured using a CodebookConfig parameter structure. This parameter structure uses the combination of codebookType and subtype to identify any relevant PMI reporting solutions. Each PMI reporting solution and the corresponding relevant parameter sets for the Type II Port Selection solution.

CITATION LIST

Non-Patent Reference

[Non-Patent Reference 1] 3GPP RP 193133, "New WID: Further enhancements on MIMO for NR", December, 2019.

[Non-Patent Reference 2] 3GPP TS 38.214, "NR; Physical layer procedures for data (Release 16)".

SUMMARY

In general, in one aspect, embodiments disclosed herein relate to a terminal that includes a receiver that receives beamforming information relating to one or more beamformed Channel State Information—Reference Signals (CSI-RSs), the CSI-RSs corresponding to one or more Spatial Domains (SDs) or Frequency Domains (FDs). The terminal also includes a processor that: determines a type of the one or more CSI-RSs, and when the type of the one or more CSI-RS is a Type II, performs a Type II port selection codebook with a beamformed CSI-RS of the one or more CSI-RSs in the SD and FD domains.

In general, in one aspect, embodiments disclosed herein relate to terminal that includes a receiver that receives beamforming information relating to one or more beamformed Channel State Information—Reference Signals (CSI-RSs), the one or more beamformed CSI-RSs corresponding to one or more Spatial Domains (SDs) or Frequency Domains (FDs) and the beamforming information being obtained from higher layer signaling or Downlink Control Information (DCI). The terminal also includes a processor that: determines a number of ports of SD beams in SD domains, determines a number of ports of FD beams in FD domains, and performs port selection with a beamformed CSI-RS out of the one or more beamformed CSI-RSs in the SD beams and the FD beams.

In general, in one aspect, embodiments disclosed herein relate to a terminal that includes a receiver that receives beamforming information relating to one or more beamformed Channel State Information—Reference Signals (CSI-RSs), the one or more CSI-RSs corresponding to one or more Spatial Domains (SDs) or Frequency Domains (FDs). The terminal also includes a processor that: freely selects a number of ports of SD beams in SD domains considered for beamforming out of the one or more beamformed CSI-RSs, freely selects a number of ports of FD beams in FD domains considered for beamforming out of the one or more beamformed CSI-RSs, and performs port selection with a beamformed CSI-RS out of the one or more CSI-RSs in the SD beams and the FD beams.

In general, in one aspect, embodiments disclosed herein relate to a terminal that includes a receiver that receives beamforming information relating to one or more beamformed Channel State Information—Reference Signals (CSI-RSs), the one or more beamformed CSI-RSs corresponding to one or more Spatial Domains (SDs) or Frequency Domains (FDs). The terminal also includes a processor that: determines a number of ports of SD beams in SD domains of a first sampling size, determines a number of ports of FD beams in FD domains of a second sampling size, and performs port selection with a beamformed CSI-RS out of the one or more beamformed CSI-RSs in the SD beams and the FD beams.

In general, in one aspect, embodiments disclosed herein relate to a method for performing beamforming in angle-delay domains. The method includes obtaining beamforming information relating to one or more CSI-RS, the CSI-RS beamforming corresponding to SD and FD domains. The method includes determining a type of the one or more CSI-RS. In a case when the type of the one or more CSI-RS is a Type II, the method includes performing Type II port selection codebook with beamformed CSI-RS in the SD and FD domains.

In general, in one aspect, embodiments disclosed herein relate to a method for performing beamforming in angle-delay domains. The method includes obtaining beamforming information relating to one or more CSI-RS, the CSI-RS corresponding to SD and FD domains and the beamforming information being obtained from higher layer signaling or DCI. The method includes determining a number of ports of SD beams in SD domains. The method includes determining a number of ports of FD beams in FD domains. The method includes performing port selection with beamformed CSI-RS out of the one or more CSI-RS in the SD beams and the FD bases.

In general, in one aspect, embodiments disclosed herein relate to a method for performing beamforming in angle-delay domains. The method includes obtaining beamforming information relating to one or more CSI-RS, the CSI-RS corresponding to SD and FD domains. The method includes freely selecting a number of ports of SD beams in SD domains considered for beamforming CSI-RS out of the one or more CSI-RS. The method includes freely selecting a number of ports of FD bases in FD domains considered for beamforming CSI-RS out of the one or more CSI-RS. The method includes performing port selection with beamformed CSI-RS out of the one or more CSI-RS in the SD beams and the FD beams.

In general, in one aspect, embodiments disclosed herein relate to a method for performing beamforming in angle-delay domains. The method includes a obtaining beamforming information relating to one or more CSI-RS, the CSI-RS corresponding to SD and FD domains. The method includes determining a number of ports of SD beams in SD domains of a first sampling size. The method includes determining a number of ports of FD beams in FD domains of a second sampling size. The method includes performing port selection with beamformed CSI-RS out of the one or more CSI-RS in the SD beams and the FD beams.

Advantageously, enhancements on CSI measurement and reporting are being discussed in the development of Release 17 of NR. One such enhancement includes evaluating and, if needed, specifying CSI reporting for Downlink (DL) multi-Transmission Reception Points (TRP) and/or multi-panel transmission to enable more dynamic channel/interference hypotheses for non-coherent joint transmission (NCJT), targeting both Frequency Range 1 (FR1) (i.e., 410 MHz to 7,125 MHz, sub-6 GHz) and Frequency Range 2 (FR2) (i.e., 24,250 MHz to 52,600 Mhz, mmWaves). Another such enhancement includes evaluating and, if needed, specifying Type II port selection codebook enhancements (based on Rel.15/16 Type II port selection) where information related to angle(s) and delay(s) are estimated at a gNB based on Sound Reference Signal (SRS) by utilizing DL/Uplink (UL) reciprocity of angle and delay. The remaining DL CSI is reported by the UE, mainly targeting Frequency Division Duplex (FDD) FR1 to achieve better trade-off among UE complexities, performance, and reporting overhead.

In view of the above enhancements, the present invention describes how Type II port selection codebook can be further enhanced by taking into consideration the inherent angle-delay reciprocity of the propagation channel.

Other aspects of the disclosure will be apparent from the following description and the appended claims.

BRIEF DESCRIPTION OF THE DRAWINGS

FIG. 1 is a diagram showing a configuration of a wireless communication system according to one or more embodiments of the present invention.

FIG. 2 shows an example in accordance with one or more embodiments.

FIG. 4 shows an example in accordance with one or more embodiments.

FIG. 5 shows an example equation (4) in accordance with one or more embodiments.

FIG. 6 shows an example equation (5) in accordance with one or more embodiments.

FIG. 7 shows an example frequency response graph in accordance with one or more embodiments.

FIG. 8 shows an example equation (6) in accordance with one or more embodiments.

FIG. 9 shows an example equation (7) in accordance with one or more embodiments.

FIG. 13 shows an example set in accordance with one or more embodiments.

DETAILED DESCRIPTION

Figure 3A:
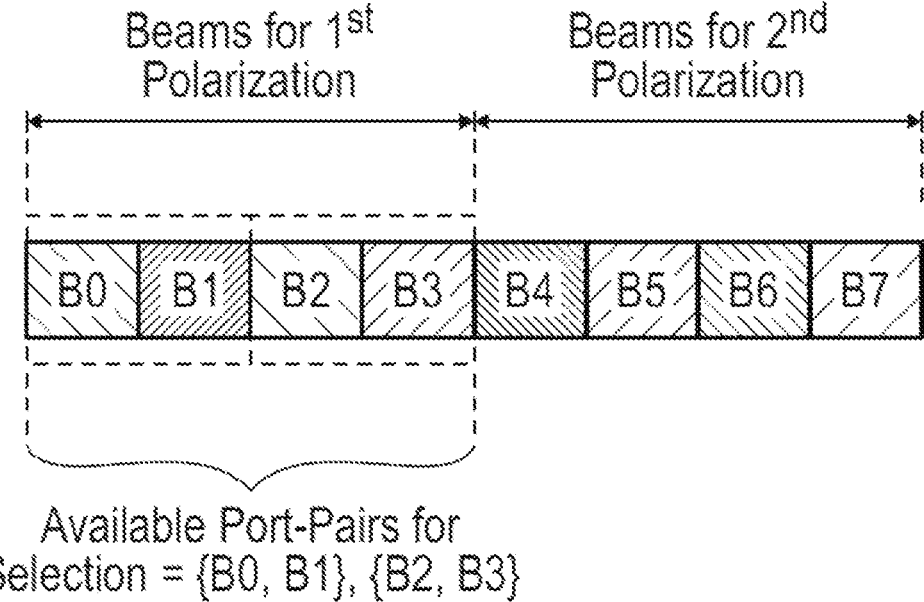
FIG. 3A shows an example in accordance with one or more embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

A wireless communication system 100 according to one or more embodiments of the present invention will be described below with reference to FIG. 1.

As shown in FIG. 1, the wireless communication system 100 includes a User Equipment (UE) 10, a Base Station (BS) 20, and a core network 30. The wireless communication system 100 may be an New Radio (NR) system or a Long Term Evolution (LTE)/LTE-Advanced (LTE-A) system.

The BS 20 communicates with the UE 10 via multiple antenna ports using a multiple-input and multiple-output (MIMO) technology. The BS 20 may be a gNodeB (gNB) or an Evolved NodeB (eNB). The BS 20 receives downlink packets from a network equipment such as upper nodes or servers connected on the core network 30 via the access gateway apparatus, and transmits the downlink packets to the UE 10 via the multiple antenna ports. The BS 20 receives uplink packets from the UE 10 and transmits the uplink packets to the network equipment via the multiple antenna ports.

The BS 20 includes antennas for MIMO to transmit radio signals between the UE 10, a communication interface to communicate with an adjacent BS 20 (for example, X2 interface), a communication interface to communicate with the core network (for example, S1 interface), and a CPU (Central Processing Unit) such as a processor or a circuit to process transmitted and received signals with the UE 10. Functions and processing of the BS 20 described below may be implemented by the processor processing or executing data and programs stored in a memory. However, the BS 20 is not limited to the hardware configuration set forth above and may include any appropriate hardware configurations. Generally, a plurality of the BSs 20 may be disposed so as to cover a broader service area of the wireless communication system 1.

The UE 10 communicates with the BS 20 using MIMO technology. The UE 10 transmits and receives radio signals such as data signals and control signals between the BS 20 and the UE 10. The UE 10 may be a mobile station, a smartphone, a cellular phone, a tablet, a radio terminal, a mobile router, or information processing apparatus having a radio communication function such as a wearable device.

The UE 10 includes a CPU such as a processor, a RAM (Random Access Memory), a flash memory, and a radio communication device to transmit/receive radio signals to/from the BS 20 and the UE 10. For example, functions and processing of the UE 10 described below may be implemented by the CPU processing or executing data and programs stored in a memory. The UE 10 is not limited to the hardware configuration set forth above and may be configured with, e.g., a circuit to achieve the processing described below.

The wireless communication 1 supports Type II CSI feedback. As shown in FIG. 1, at step S1, the BS 20 transmits CSI-Reference Signals (RSs). When the UE 10 receives the CSI-RSs from the BS 20, the UE 10 performs measurements of the received CSI-RSs. Then, at step S2, the UE 10 performs CSI reporting to notify the BS 20 of the CSI as CSI feedback. For example, the CSI includes at least one of rank indicator (RI), precoding matrix indicator (PMI), channel quality information (CQI), CSI-RS resource indicator (CRI), a wideband (WB) amplitude, and a subband (SB) amplitude. In one or more embodiments of the present invention, the CSI reporting that reports the SB amplitude may be referred to as SB amplitude reporting. For example, rather than reporting the SB amplitude every time when the CSI reporting takes place, the periodicity of reporting the SB amplitude may be dynamically adjusted using higher layer signaling from the BS 20. The SB amplitude reporting may be performed for K leading coefficients. For example, if K is small, the number of coefficients reporting SB amplitudes is small.

If the SB amplitudes are small compared to an amplitude of the strongest coefficient, achievable gains with SB amplitude reporting may be marginal. That may occur when a user channel is highly sparse in an environment with very few scatterers, for example.

Furthermore, in one or more embodiments, while Type II CSI feedback may allow layer handling up to layers with RI of 1 and 2, by altering the scheme, Type II CSI feedback may also be implemented in ranks greater than 2 As such, by extending Type II CSI feedback scheme for rank>2, spectral efficiency can be further enhanced. Extending the Type II CSI feedback scheme to ranks greater than 2 may reduce the overhead generally associated with the scheme.

To this point and as indicated above, Type II CSI precoding vector generation for $N_3$ precoding matrix indicator (PMI) sub-bands considering RI=v, layer $l \in \{1, 2, \ldots v\}$ transmission may be evaluated. For example, $$W_l(N_t \times N_3) = W_{1,l} W_{coeff,l} \tag{2}$$

In the above equation, $W_{1,l}$ ($N_t \times 2L$) is a matrix consisting of L SD 2D-DFT basis for layer l, L is a Beam number, $N_t$ is a Number of ports, and $W_{coeff,l}$ ($2L \times N_3$) is an SB complex combination coefficient matrix for layer l.

In the above equations, the SD 2D-DFT basis subset may be given as $\{b_{l,L}, \ldots b_{l,L}\}$ where $b_{l,i}$ is the i-th ($\in \{1, \ldots, L\}$) 2D DFT basis vector corresponding to the l-th layer.

In one or more embodiments, frequency domain compression must be accounted for as information within $W_{coeff,l}$, which may be compressed. As such, the corresponding overhead may be further reduced. For example, Type II CSI precoding vectors of layer l for $N_3$ SBs considering Frequency Domain (FD) compression can be given by expanding $W_{coeff,l}$ from rule (2).

$$W_l(N_t \times N_3) = W_{1,l} \, \tilde{W}_l \, W_{freq,l}^H \tag{3}$$

In the above equation, $W_{freq,l}(N_3 \times M)$ is a matrix consisting of M FD DFT basis vectors for layer l and $\tilde{W}_l(2L \times M)$ is a matrix consisting of complex combination coefficients for layer l. Furthermore, the frequency domain DFT basis subset may be given as $\{f_{l,1}, \ldots f_{l,M}\}$ where $f_{l,i}$ is the i-th ($\in \{1, \ldots, M\}$) DFT basis vector corresponding to the l-th layer. Additionally, M is calculated as, $$M = \left\lceil p \times \frac{N_3}{R} \right\rceil$$

where $R \in \{1, 2\}$. Given L and p, the number of SD and FD basis subsets for layer l can be identified.

In one or more embodiments, in order to achieve a proper balance between performance and overhead, it is important to identify SD and FD bases across layers appropriately.

A wireless communication system 200 according to one or more embodiments of the present invention will be described below with reference to FIG. 2.

As shown in FIG. 2, the wireless communication system 200 includes the BS 20 that communicates with the UE 10 via multiple antenna ports using the MIMO technology. A Type II port selection codebook does not require the UE 10 to derive spatial domain (SD) beams considering 2D-DFT basis as in regular Type II codebook. In this case, the BS 20 may be a gNB that transmits a number K of beamformed (BF) CSI-RS ports as a viable set of SD beams. The UE 10 has to identify a number L(≤K) of best CSI-RS ports (i.e., beams) and to report their corresponding indices within $W_1$.

SB-wise precoding vector generation with NR Release 16 Type II port selection codebook for layer l∈{1, 2, 3, 4} by further modifying (2) and (3) can be given as:

$$W_l(N_t \times N_3) = QW_1 \, \widetilde{W_l} \, W_{f,l}^H \quad (4)$$

In this case, Q (N$_t$×K) may represent a number K of SD beams used for CSI-RS beamforming, $W_1$ (K×2L) may represent a block diagonal matrix, $\widetilde{W_l}$ (2L×M) may represent a linear combination (LC) coefficient matrix, and $W_{f,l}$ (N$_3$×M) may be used for DFT basis vectors (i.e., FD bases).

A number of CSI-RS ports $P_{CSI-RS}$ may include the number K of BF CSI-RS ports being configured by higher layer signaling. In this case, $P_{CSI-RS}$∈{4, 8, 12, 16, 24, 32}. $W_1$ consists of column vectors of an identity matrix. As such, each such vector signifies a selected beam. To this point, a number of ports is selected, and these ports may include the number L being configured by higher layer signaling. In this case, L∈{2, 3, 4} when $P_{CSI-RS}$>4.

The selection of SD beams within Q is transparent to the UE 10. Specifically, the SD beams can be determined based on sounding reference signals (SRS) or UL Demodulation Reference Signal (DMRS) transmission. In this case, even though the UL dominant sub-space is not the same as that of the DL, port selection in the DL allows the UE 10 to approximately select ports covering the DL dominant sub-space.

Figure 3B:
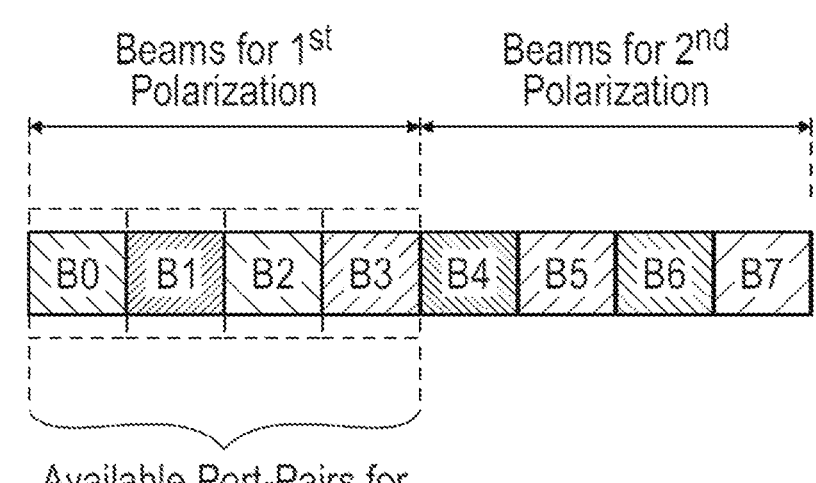
FIG. 3B shows an example in accordance with one or more embodiments.

FIG. 3A and FIG. 3B show reporting of $W_1$ based on selected beams. In some embodiments, a parameter d may be configured by the BS 20 determines a sampling granularity for both groups. In this case, a CSI report in NR may be made up of two granularities (e.g., categories). In some embodiments, d may be configured as d∈{1, 2, 3, 4} and d≤L. In such case, the UE 10 may report $i_{1,1}$ as part of PMI to select L beams following:

$$i_{1,1} \in \left\{0, 1, K, \left\lceil \frac{P_{CSR-RS}}{2d} \right\rceil - 1 \right\} \quad (5)$$

For example, as shown in FIG. 3A and FIG. 3B, (5) may be used to determine available port-pairs for selection out of the beams for polarization. In FIG. 3A, letting K=8 and L=2, the calculation may result in a first case where d=2 such that 4,1={0,1}. In this regard, the available port-pairs for selection may be equal to {B0, B1} and {B2, B3}. In FIG. 3B, letting K=8 and L=2, the calculation may result in a second case where d=1 such that $i_{1,1}$={0, 1, 2, 3}. In this regard, the available port-pairs for selection may be equal to {B0, B1}, {B1, B2}, {B2, B3}, and {B3, B0}.

In FIG. 3A and FIG. 3B, $W_1$ is set as follow:

$$W_1 = \begin{bmatrix} E & 0 \\ 0 & E \end{bmatrix}, \text{ where } E = \begin{bmatrix} E & 0 \\ 0 & E \end{bmatrix}.$$

In this case, $$E = \left[ e_{mod(i_{1,1}d,K/2)}^{K/2} \quad e_{mod(i_{1,1}d+1,K/2)}^{K/2} \right],$$

where $$e_l^{K/2}: A(K/2 \times 1)$$

represents a vector with all zeros except 1 at l$^{th}$ location.

In view of the aforementioned calculations, a Type II port selection codebook can be further enhanced by taking into consideration the port selection of both SD beams and frequency domain (FD) basis vectors in $W_{f,l}$ of (4). As such, in some embodiments, a general structure for SBS-wise precoder generation for port selection codebook can be given by:

$$W_l(N_t \times N_3)QW_1 \widetilde{W_l} (SW_{f,l})^H \quad (2')$$

In this case, Q (N$_t$×K) may represent a number K of beamformed CSI-RS ports for SD beam selection such that b$_i$ is i∈{1, 2, . . . K} for an i-th SD basis vector, S(N$_t$×K') may represent a number K' of beamformed CSI-RS ports for FD basis selection such that f$_j$ is j∈{1, 2, . . . K'} for an j-th FD basis vector, $W_1$ (K×2L) may represent a block diagonal matrix where each matrix block consists of L columns of an (K×K) identity matrix. Wu (K'×M) may represent a matrix consisting of columns of an (K'×K') identity matrix, and $\widetilde{W_l}$ (2L×M) may represent a linear combination (LC) coefficient matrix. Further, in this case, Q and S may be, for example, $$Q=[b_1 b_2 \ldots b_K] \text{ and } S=[f_1 f_2 \ldots f_K].$$

In (2'), beamforming is done both in SD and FD, and FD bases for beamforming can be determined considering delay reciprocity. The BS 20 transmits (K×K') beamformed CSI-RS ports. The selection of K SD beams and K' FD bases is transparent to the UE. In this case, the UE selects a number 2L of SD beams and a number M of FD bases and report them back to the BS 20 as part of the PMI. Here, the $W_1$ and the $W_{f,l}$ may capture selected SD and FD bases. In addition, the $\widetilde{W_l}$ is reported along with the LC coefficients by the UE 10.

In some embodiments, each SD beam may be paired with a single FD basis such that K=L,K'=M, and K=K'. No port selection and hence diagonal blocks in $W_1$ in (2') are (K×K) identity matrices. Further, Wu in (2') also becomes a block diagonal matrix with two diagonal blocks of (K×K) identity matrices. This can be given as $$W_1 = \begin{bmatrix} I_K & 0 \\ 0 & I_K \end{bmatrix} \text{ and } W_{f,l} = \begin{bmatrix} I_K & 0 \\ 0 & I_K \end{bmatrix},$$

in which I$_K$: K×K is the identity matrix. As such, $W_1$ in (2') is a (2K×2K) diagonal matrix.

In view of the above, in the UE 10, as part of precoding matrix indicator (PMI), reports 2K LC coefficients in $\widetilde{W_l}$ which are the diagonal elements of the matrix. Similarly, in the BS 20, the number K of CSI-RS ports are transmitted each beamformed with a SD-FD pair. An example of SD-FD bases pairing for CSI-RS beamforming can be given as {b$_1$, f$_1$}, {b$_2$,f$_2$}, {b$_K$, f$_K$}.

In some embodiments, each SD beam may be paired with a single FD basis such that $K \geq L$, $K' \geq M$, $K=K'$, and $L=M$. Here, the UE 10 may select the number L of SD-FD pairs out of the number K beamformed CSI-RS sports. In this regard, diagonal blocks in $W_1$ in (2') are (K×L) matrices where each matrix block consisting of the number L columns (corresponding to selected ports) of an (K×K) identity matrix. Further, based on $W_1$, $W_{f,l}$ in (2') may be determined since each SD beam is associated with a single FD basis. To this point, Wu is also a block diagonal matrix with each matrix block consisting of L columns and $\tilde{W}_l$ in (2') is a (2L×2L) diagonal matrix.

In view of the above, in the UE 10, based on a predetermined criteria, identifies the number L of ports out of the number K (beamformed CSI-RS ports) and reports to the BS 20 as part of PMI. These L ports correspond to L columns of $W_1$ and the number 2L of LC coefficients in $\tilde{W}_l$ are the diagonal elements of the matrix, which are reported by UE. Similarly, in the BS 20, the number K of CSI-RS ports are transmitted each beamformed with a SD-FD pair. An example of SD-FD bases pairing for CSI-RS beamforming can be given as $\{b_1,f_1\}$, $\{b_2,f_2\}$, $\{b_K, f_K\}$.

In some embodiments, the general structure for the port selection codebook in equation (2'), which represents the final precoder generation at the NW side, can be further simplified and given as follows considering the reported port selection matrix $W_{1,l}$ and LC coefficients in $\tilde{W}_l$ by the UE.

Recall equation (2'):

$$W_l(N_t \times N_3) = Q W_1 \tilde{W}_l (S W_{f,l})^H$$

Since each SD may be associated with a single FD, when selecting SD beams, the associated FDs are also selected. Hence, $W_1 = W_{f,l}$.

As a result consider that:

$$=([b_1 b_2 \ldots b_K] \times W_1) \times \tilde{W}_l \times ([f_1 f_2 \ldots f_K] \times W_1)^H$$

It is noted that under an assumption, the considered SD-FD pairs for beamforming are, $\{b_1,f_1\}$, $\{b_2,f_2\}$, $\{b_K, f_K\}$ and indices of selected SD and FD bases are, $s(1)$, $s(2) \ldots s(L)$.

With respect to polarization common port selection consider the following:

$$=([b_1 b_2 \ldots b_K] \times W_1) \times \tilde{W}_l \times ([f_1 f_2 \ldots f_K] \times W_1)^H$$

And equation (3) as follows:

$$= \begin{pmatrix} [b_{s(1)} \ b_{s(2)} \ \ldots \ b_{s(L)}] & 0 \\ 0 & [b_{s(1)} \ b_{s(2)} \ \ldots \ b_{s(L)}] \end{pmatrix} \times$$
$$\tilde{W}_1 \times \begin{pmatrix} [f_{s(1)} \ f_{s(2)} \ \ldots \ f_{s(L)}] & 0 \\ 0 & [f_{s(1)} \ f_{s(2)} \ \ldots \ f_{s(L)}] \end{pmatrix}^H$$

With reference to FIG. 5 showing example equation (4), consider that $\widetilde{W}_l$ consists of reported 2L LC coefficients in its diagonal as:

$$\tilde{W}_l = \begin{pmatrix} c_1 & \ldots & 0 \\ \vdots & \ddots & \vdots \\ 0 & \ldots & c_{2L} \end{pmatrix}$$

Substituting $\widetilde{W}_l$ in to equation (3), and after some manipulations the SB-wise precoder for each polarization generated at the gNB can be given as shown by equation (4) in FIG. 5. Similarly, starting from equation (2'), a polarization specific SB-wise precoder generation can also be derived. In some embodiments with no port selection, precoders for two polarizations can be given as in equation (4). In particular, summation should go from 1 to K for incorporating all SD-FD pairs.

With reference to FIG. 6, consider that a precoder from the perspective of the UE can be given as shown by example equation (5) in FIG. 6. In equation (5), km is a column vector from a (K×K) identity matrix. In particular, this vector selects SD and FD bases with index, s (i). Since there will be a single LC coefficient reported per port, $c_i$, $i \in \{1, L\}$, from perspective of the UE this is wide-band (WB) CSI reporting.

Turn now to a discussion of why WB CSI reporting may be sufficient when SD-FD pair-based CSI-RS beamforming is considered with reference to FIG. 7. Consider the physical meaning of SD-FD pair based CSI-RS beamforming. For example, assume K ports CSI-RS transmission. Then, the frequency response of the observed channel at the UE associated with n-th port can be represented as show by the graph in FIG. 7.

With reference to FIG. 8, consider Type II port selection codebook structures. In order to further improve performance, a UE can be configured to report additional My FD bases for the delay pre-compensated channel of n-th port (captured in FIG. 7). The precoder from perspective of the UE for that case can be given as shown by equation (6) in FIG. 8.

In equation (6), $\bar{b}_s(i)$ is a column vector from a (K×K) identity matrix. In particular, this vector selects SD and FD bases with index, s(i). Further, in equation (6) $\tilde{f}_{s(j)}$ is a column vector from a (N_3×N_3) DFT matrix and s(j) represents index of the selected j-th DFT vector.

Here, $\tilde{f}_{s(j)}$, $j \in \{1, \ldots M_v\}$ are the selected additional FD bases from a DFT matrix. For identifying additional My FD bases, one possible approach may be to follow DFT bases identification for FD compression in the Release 16 specification such as in [2]. It is noted that a UE can report, as part of its capability reporting, whether it can support additional FD bases selection and reporting.

With reference to FIG. 9, consider Type II port selection codebook structures. Consider that the selected DFTs can be port specific as well. Accordingly, equation (6) can be updated as shown by equation (7) in FIG. 9. In equation (7), $\bar{b}_{s(i)}$ is a column vector from a (K×K) identity matrix. In particular, this vector selects SD and FD bases with index, s(i). Additionally, in equation (7), $\tilde{f}_{si(j)}$ is a column vector from a (N_3×N_3) DFT matrix and si (j) represents index of the selected j-th DFT vector of i-th port.

Figure 10:
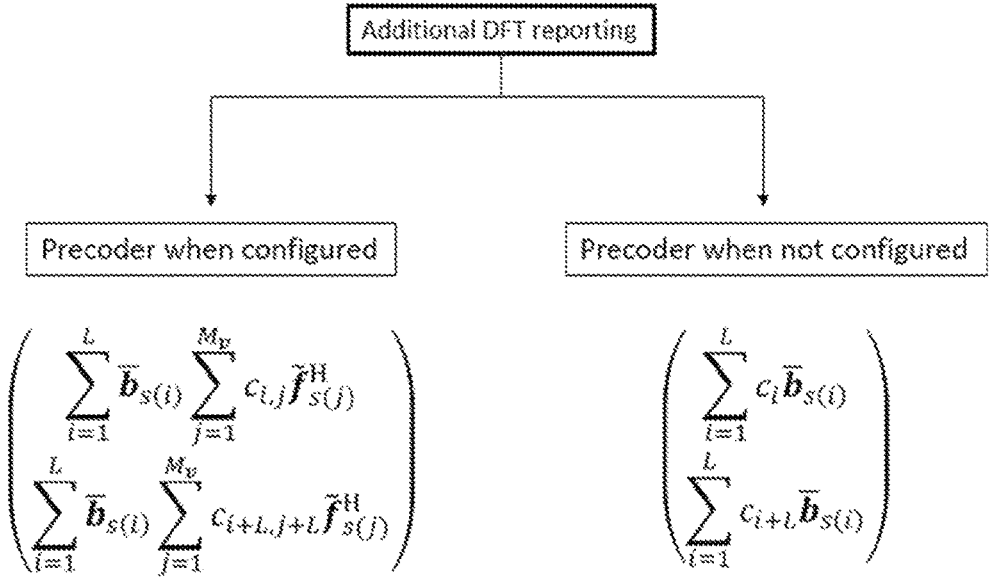
FIG. 10 shows an example selection of precoding in accordance with one or more embodiments.

With reference to FIG. 10, consider Type II port selection codebook structures. Consider that by using higher-layer signaling or DCI, a UE can be configured with whether to report additional DFTs, as described in some embodiment, considering SB reporting (i.e., a precoder as in equation (6) or equation (7)) or WB reporting (i.e., a precoder as in equation (5)) may be sufficient. For example, refer to the decision tree in FIG. 10 describing the determination of additional DFT reporting. It is noted that such reporting may be implicitly or explicitly signaled.

In some embodiments, for selecting additional FD bases (DFTs) consider one or more of the following. In some embodiments, using higher-layer signaling or DCI, the NW indicates/configures a 'set of DFTs' and the UE selects M number of DFTs out of the set and reports them. In some embodiments, the NW may explicitly indicate DFT bases to consider for selecting additional FD bases, e.g., the NW indicates DFTs $\tilde{f}_1$, $\tilde{f}_2$ $\tilde{f}_5$, $\tilde{f}_6$ and out of those UE selects $\tilde{f}_1$, $\tilde{f}_4$ if $M_v=2$. In some embodiments, the NW configures the starting position and the length M of a DFT bases group. Subsequently, the UE selects My DFTs out of that group, e.g., the NW configures, M=4 and the starting position as $f_3$ DFT basis.

Figure 11:
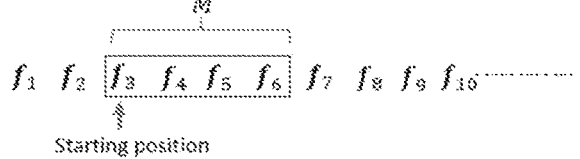
FIG. 11 shows an example set in accordance with one or more embodiments.

FIG. 11 shows an example set in accordance with some embodiments. In the example of FIG. 11, there can be multiple groups configured by higher-layer signaling and using DCI or MAC-CE one group out of those can be selected as shown. Additionally, the UE may then select $\tilde{f}_3$, $\tilde{f}_4$ if $M_v=2$ out of those configured DFT bases group. For reporting selected DFT bases, the UE can use combinatorial signaling such as $$\binom{M}{M_v}.$$

In some embodiments, it is also possible that the UE may be configured to use all the configured DFTs by the NW as additional FD bases. Hence, no need of DFT reporting is necessary by the UE.

In some embodiments, the UE may freely select $M_v$ number of DFTs and report them. It is noted that the difference between one or more embodiments is that, in some embodiments the 'set of DFTs' are not configured by the NW for additional DFT selection.

Figure 12:
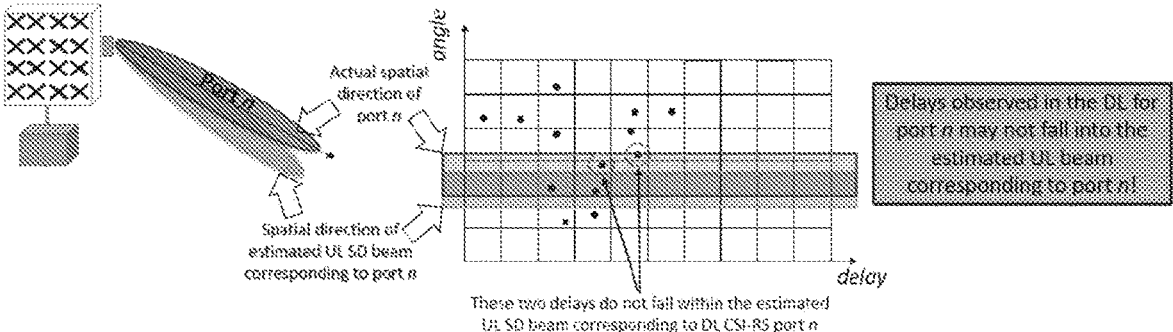
FIG. 12 shows an example graph with angle and delay in accordance with one or more embodiments.

Consider the importance of free selection of DFTs. Since the effective antenna-spacing may be different in two bands for FDD (i.e., due to same physical spacing but different wavelengths), when angles are sampled through the phased array the set of angles sampled in UL are different from the ones in the DL. An example can be given as shown in FIG. 12.

In some embodiments, for reporting selected DFT bases the UE can use combinatorial signaling with, $$\left\lceil \log_2\binom{N_3}{M_v} \right\rceil$$

bits. In some embodiments, for reporting selected DFT bases, the UE may first identify a window of size $\overline{N}_3$ from DFT bases as shown in FIG. 13. Here, a size $\overline{N}_3$ can be pre-defined in the specification(s), derived from another configured parameter, e.g., based $M_v$ or the like, or configured using higher-layer signaling or DCI. Further, it is possible that the UE explicitly reports this value as well. Also consider that starting position $M_{init}$ can be pre-defined in the specification(s), derived from another configured parameter, e.g., based $M_v$ etc., or configured using higher-layer signaling or DCI. Further, it is possible that the UE explicitly reports this value as well. Subsequently, for reporting selected DFT bases from the identified window, the UE can use combinatorial signaling as $$\binom{\overline{N}_3}{M_v}.$$

It is noted that in one or more embodiments, a CSI report can be UCI reporting in L1 layer or MAC CE in L2 layer.

In some embodiments, using higher-layer signaling or DCI, the UE may be configured with the value for M. That is, in some embodiments there may be a set of values configured using RRC signaling and one value out of those is explicitly or implicitly indicated using DCI. For example, a set of values {1, 2, 3, 4} are configured by RRC signaling and using 2-bits in DCI one value out of those is selected for M. It is also possible that, without using additional DCI bits, DCI implicitly indicates to the UE a configured value for $M_v$. In some embodiments, a set of values for $M_v$ is pre-configured in the specification(s) and using higher-layer signaling or DCI, one value out of those is configured. In some embodiments, a value of $M_v$ is pre-configured in the specification(s), e.g., $M_v=2$. Possible values for $M_v$ are 1, 2, 3. Those skilled in the art will appreciate that other values are not precluded.

In some embodiments regarding higher rank transmission, selected additional $M_v$ FD bases of one or more embodiments can be common to all the layers in the selected/identified rank. In some embodiments, additional $M_v$ FD bases are layer-specific and hence selected per layer. In some embodiments, additional $M_v$ FD bases are common for set of layers and hence selected per layer group.

In some embodiments, each SD beam may be paired with multiple FD bases such that K≥L, and K'≥M. Here, the UE 10 may select the number L of SD beams and the number $M_v$ of FD bases for each SD beam. In this regard, each SD beam (out of the number K) is paired with all the number K' of FD bases for beamformed CSI-RS. Hence, the total number of CSI-RS ports may be KK'. The number of M selected bases may be "beam common" or "beam specific." "Beam common" is when a same set of the number $M_v$ of FD bases are selected for all SD beams. "Beam specific" is when the number $M_v$ of FD bases are SD beam specific. Diagonal blocks in $W_1$ in (6) are (K×L) matrices where each matrix block consisting of L columns (corresponding to selected ports) of an (K×K) identity matrix.

For "beam common" FD bases selection, Wu in (6) is a (K'×M) matrix where the number $M_v$ of columns (corresponding to selected FD bases) are from the (K'×K') identity matrix. Further, $\tilde{W}_l$ in (6) is a (2L×M) matrix consisting of the number 2LM of LC coefficients.

For "beam specific" FD bases selection, $W_{f,l}$ in (6) is a (K'×2LM) matrix where the number 2LM of columns (corresponding to selected FD bases) are from the (K'×K') identity matrix. Further, $W_{f,l}$ can be shown as $W_{f,l}=[E_1 \ldots E_{2L}]$, where the $E_1$(K'×M) matrix is defined by i∈{1, 2, . . . 2L} with columns from the (K'×K') identity matrix. As such, $E_i$ captures selected M FD bases for i-th SD beam. Further, $\tilde{W}_l$ in (6) is a (2L×2LM) block-diagonal matrix which may be represented as $$\tilde{W}_t = \begin{bmatrix} C_1 & \cdots & 0 \\ \vdots & \ddots & \vdots \\ 0 & \cdots & C_{2L} \end{bmatrix},$$

in which $C_l$(1×M) is a row vector defined by l∈{1, 2, . . . 2L} with LC coefficients of l-th SD beam.

In view of the above, the UE 10 identifies, based on one or more criteria, the number L of ports out of the number K of SD beams and reports to the BS 20 as part of the PMI. These L ports correspond to L columns of $W_1$. For "beam common" FD bases selection, the UE 10 identifies based on some criteria, the number M of ports out of the number K' of FD bases which are common for all SD beams and reports to the BS 20 as part of PMI. These M ports correspond to M columns of $W_{f,l}$. For "beam specific" FD bases selection, the UE 10 identifies based on some criteria, the number M of ports out of the number K' of FD bases for each SD beam separately and reports to the BS 20 as part of the PMI. In this case, the selected M ports for the i-th SD beam correspond to the M columns in $E_i$ of $W_{f,i}=[E_1 \ldots E_{2L}]$. Then, $W_{f,l}$ collects all $E_i$ as defined by $i \in \{1, 2, \ldots 2L\}$ as $W_{f,i}=[E_1 \ldots E_{2L}]$. Further, 2LM LC coefficients in $\tilde{W}_l$ are also reported by UE 10. In this case, the BS 20 transmits the number KK' of CSI-RS ports where each SD beam out of the number K is paired with all K' FD bases for beamformed CSI-RS. An example of SD-FD bases pairing for CSI-RS beamforming can be given as $\{b_i, f_j\}$ where $i \in \{1, 2, \ldots K'\}$ and $j \in \{1, 2, K'\}$.

In view of the above, for example, for the UE 10 to operate in Release 17 of the 3GPP standard port selection codebook, the UE 10 may be configured with higher layer parameter codebookType set to typeII-PortSelection-r17.

In view of the above, for example, the number of CSI-RS ports may be configured using higher layer parameter nrof-Ports where the value can be for example, one out of 4, 8, 12, 16, 24, 32, 64. Other values may not be excluded.

In view of the above, for example, the number of CSI-RS ports to be selected for SD beams, the number L, and the number of ports to be selected for FD bases, M are configured using higher layer signaling or DCI.

First possible values for L are defined by specifications and the NW selects one out of those using higher layer signaling or x-bit(s) in DCI. For example, $L \in \{2, 4, 6, 8, 10, 12\}$, then using 3-bits in DCI, the NW selects the value of the number L. Possible values for the number M are defined by specification and the NW selects one out of those using higher layer signaling or x-bit(s) in DCI. For example, $M \in \{2, 4, 6, 8, 10, 12\}$, then using 3-bits in DCI, the NW selects the value of the number M.

Second possible values are defined using L=M and configuring either L or M. To this point, L or M can be configured as above.

Third possible values are defined, if M is not configured, using only SD-FD pair "joint" selections needs to be done. Configuring only L is enough.

In one or more embodiments, the UE 10 freely selects set of SD beams out of the number K and the set of FD bases out of the number K'. In some embodiments, the UE 10 uses a bitmap to report selected SD beams. In this example, for selecting $1^{st}, 2^{nd}$, A $4^{th}$ and $5^{th}$ beams out of K=11 SD beams, UE will use the bitmap: 11011000000. In some embodiments, the UE 10 uses a bitmap to report selected FD bases. In this example, for selecting $1^{st}, 2^{nd}$, and $5^{th}$ FD bases out of K'=8 FD bases, the UE 10 will use the bitmap: 11001000. In some embodiments, the UE 10 uses a 2D bitmap to report selected SD-FD pairs. As shown on FIG. 4, for example, for selecting $1^{st}, 2^{nd}, 4^{th}$ and $5^{th}$ beams out of K=10 SD beams and associated FD bases $2^{nd}, 3^{rd}, 5^{th}$, and $6^{th}$ out of K'=8 FD bases, 2D bitmap can be considered. It is possible to report multiple FDs for a given SD beam as well. The UE 10 may consider a compression scheme such as combinatorial signaling or Huffman encoding to further reduce the size of the 2D bitmap.

In one or more embodiments, the UE 10 may report selected SD beams in a bitmap. Associated FD bases may be directly reported without a bitmap. In this case, the NW may have the understanding of how to map reported FDs to appropriate SD. For example, the UE 10 selects $1^{st} 2^{nd} 4^{th}$, and $5^{th}$ beams out of K=11 SD beams, and reports them in the bitmap: 11011000000. Associated FD bases are reported as $f_2 f_3 f_5 f_6$ and the NW knows $f_2$ is associated with $1^{st}$ SD beam, $f_3$ is with $2^{nd}$ SD beam, $f_5$ is with $4^{th}$ SD beam and finally $f_6$ is with $6^{th}$ SD beam.

In one or more embodiments, the UE 10 reports a number of selected SD beams $\bar{L}$ and uses combinatorial signaling to report the selected SD beams as $$\binom{K}{L}.$$

In one or more embodiments, the UE 10 reports number of selected FD bases $\bar{M}$ and uses combinatorial signaling to report the selected FD bases as $$\binom{K'}{M}.$$

In one or more embodiments, port selection sampling size for SD beam selection d and port selection sampling size for FD bases selection d' are configured using higher layer signaling or DCI. Possible values for d are predefined and the NW selects one out of those using higher layer signaling or x-bit(s) in DCI. For example, $d \in \{2, 4, 6, 8, 10, 12\}$ as defined by $d \leq L$. In this case, the NW may select the d value using 3-bits in the DCI. Possible values for d' are predefined and the NW selects one out of those using higher layer signaling or x-bit(s) in DCI. For example, $d' \in \{2, 4, 6, 8, 10, 12\}$ as defined by $d' \leq M$. In this case, the NW may select the d' value using 3-bits in DCI NW selects d' value.

In some of the embodiments described herein, only d needs to be configured. Possible values for d are defined in the spec. and NW selects one out of those using higher layer signaling or x-bit(s) in DCI. For example, $d \in \{1, 2, 3, 4, 5, 6\}$ as defined by d L, the BS 20 may select d values using 3-bits in DCI.

In one or more embodiments, the UE 10 may report the rank indicator (RI) value v according to the configured higher layer parameter typeII-PortSelectionRI-Restriction-r17. The UE may not report v>4 at this stage.

The BS 20 according to one or more embodiments of the present invention will be described below with reference to the FIG. 14.

Figure 14:
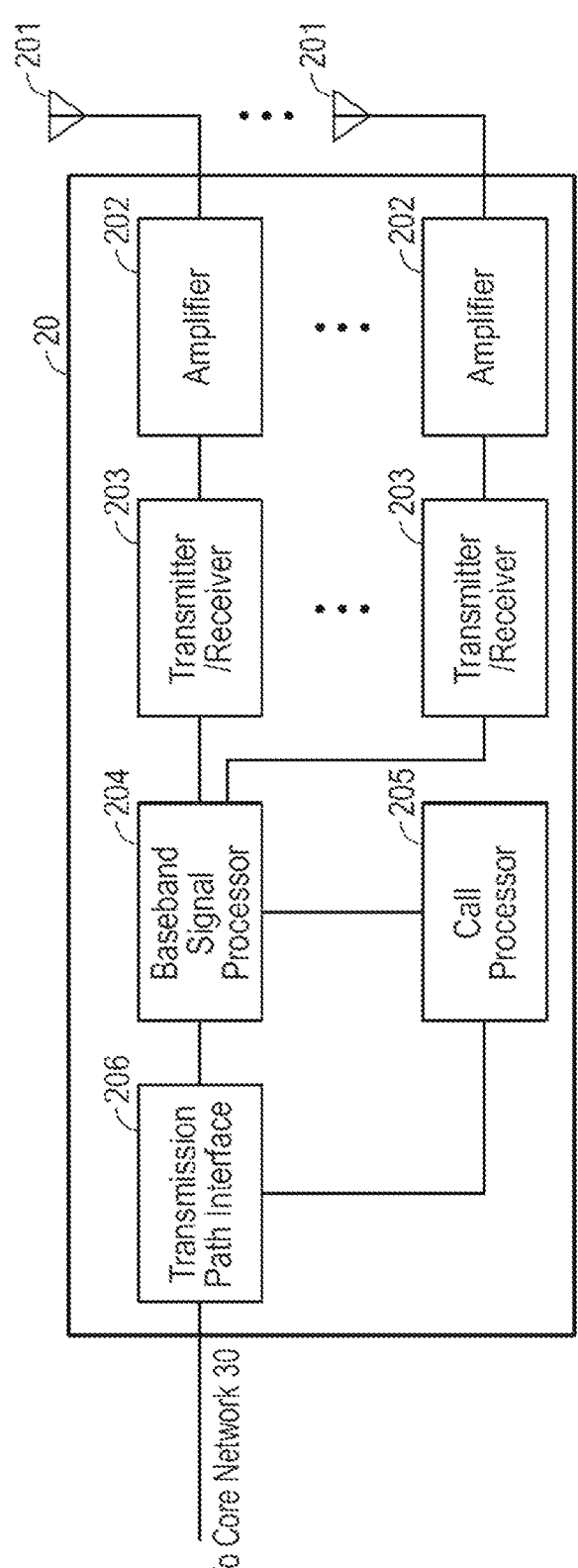
FIG. 14 shows a block diagram of an assembly in accordance with one or more embodiments.

As shown in FIG. 14, the BS 20 may include an antenna 201 for 3D MIMO, an amplifier 202, a transmitter/receiver circuit 203 (hereinafter referred as including a CSI-RS scheduler), a baseband signal processor 204 (hereinafter referred as including a CS-RS generator), a call processor 205, and a transmission path interface 206. The transmitter/receiver 202 includes a transmitter and a receiver.

The antenna 201 may comprise a multi-dimensional antenna that includes multiple antenna elements such as a 2D antenna (planar antenna) or a 3D antenna such as antennas arranged in a cylindrical shape or antennas arranged in a cube. The antenna 201 includes antenna ports having one or more antenna elements. The beam transmitted from each of the antenna ports is controlled to perform 3D MIMO communication with the UE 10.

The antenna 201 allows the number of antenna elements to be easily increased compared with linear array antenna. MIMO transmission using a large number of antenna elements is expected to further improve system performance. For example, with the 3D beamforming, high beamforming gain is also expected according to an increase in the number of antennas. Furthermore, MIMO transmission is also advantageous in terms of interference reduction, for example, by null point control of beams, and effects such as interference rejection among users in multi-user MIMO can be expected.

The amplifier 202 generates input signals to the antenna 201 and performs reception processing of output signals from the antenna 201.

The transmitter included in the transmitter/receiver circuit 203 transmits data signals (e.g., reference signals and pre-coded data signals) via the antenna 201 to the UE 10. The transmitter transmits CSI-RS resource information that indi-cates a state of the determined CSI-RS resources (e.g., subframe configuration ID and mapping information) to the UE 20 via higher layer signaling or lower layer signaling. The transmitter transmits the CSI-RS allocated to the deter-mined CSI-RS resources to the UE 10.

The receiver included in the transmitter/receiver circuit 203 receives data signals (i.e., reference signals and the CSI feedback information) via the antenna 201 from the UE 10.

The CSI-RS scheduler 203 determines CSI-RS resources allocated to the CSI-RS. For example, the CSI-RS scheduler 203 determines a CSI-RS subframe that includes the CSI-RS in subframes. The CSI-RS scheduler 203 determines at least an RE that is mapped to the CSI-RS.

The CSI-RS generator 204 generates CSI-RS for estimat-ing the downlink channel states. The CSI-RS generator 204 may generate reference signals defined by the LTE standard, dedicated reference signal (DRS) and Cell-specific Refer-ence Signal (CRS), synchronized signals such as Primary synchronization signal (PSS) and Secondary synchroniza-tion signal (SSS), and newly defined signals in addition to CSI-RS.

The call processor 205 determines a precoder applied to the downlink data signals and the downlink reference sig-nals. The precoder is called a precoding vector or more generally a precoding matrix. The call processor 205 deter-mines the precoding vector (precoding matrix) of the down-link based on the CSI indicating the estimated downlink channel states and the decoded CSI feedback information inputted.

The transmission path interface 206 multiplexes CSI-RS on REs based on the determined CSI-RS resources by the CSI-RS scheduler 203.

The transmitted reference signals may be Cell-specific or UE-specific. For example, the reference signals may be multiplexed on the signal such as PDSCH, and the reference signal may be precoded. Here, by notifying a transmission rank of reference signals to the UE 10, estimation for the channel states may be realized at the suitable rank according to the channel states.

The BS 20 further, in one or more embodiments, com-prising hardware configured for reducing feedback overhead associated with bitmap reporting between a user equipment and a base station. For example, the BS 20 may include the capabilities described above for reducing feedback overhead when communicating with the UE 10.

The UE 10 according to one or more embodiments of the present invention will be described below with reference to the FIG. 15.

Figure 15:
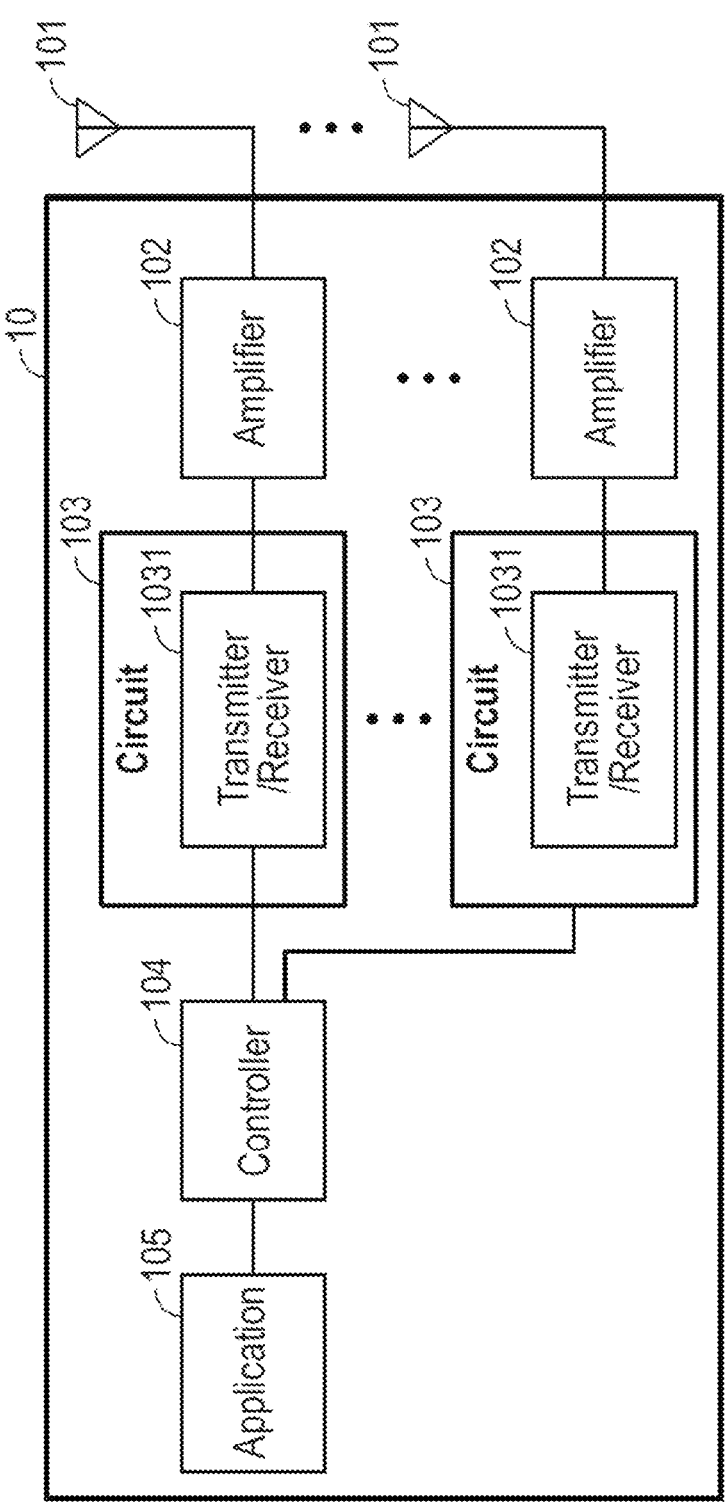
FIG. 15 shows a block diagram of an assembly in accordance with one or more embodiments.

As shown in FIG. 15, the UE 10 may comprise a UE antenna 101 used for communicating with the BS 20, an amplifier 102, a transmitter/receiver circuit 103, a controller 104, the controller including a CSI feedback controller and a codeword generator, and a CSI-RS controller. The trans-mitter/receiver circuit 103 includes a transmitter and a receiver 1031.

The transmitter included in the transmitter/receiver circuit 103 transmits data signals (for example, reference signals and the CSI feedback information) via the UE antenna 101 to the BS 20.

The receiver included in the transmitter/receiver circuit 103 receives data signals (for example, reference signals such as CSI-RS) via the UE antenna 101 from the BS 20.

The amplifier 102 separates a PDCCH signal from a signal received from the BS 20.

The controller 104 estimates downlink channel states based on the CSI-RS transmitted from the BS 20, and then outputs a CSI feedback controller.

The CSI feedback controller generates the CSI feedback information based on the estimated downlink channel states using the reference signals for estimating downlink channel states. The CSI feedback controller outputs the generated CSI feedback information to the transmitter, and then the transmitter transmits the CSI feedback information to the BS 20. The CSI feedback information may include at least one of Rank Indicator (RI), PMI, CQI, BI and the like.

The CSI-RS controller determines whether the specific user equipment is the user equipment itself based on the CSI-RS resource information when CSI-RS is transmitted from the BS 20. When the CSI-RS controller 16 determines that the specific user equipment is the user equipment itself, the transmitter that CSI feedback based on the CSI-RS to the BS 20.

The UE 10 further, in one or more embodiments, com-prising hardware configured for reducing feedback overhead associated with bitmap reporting between a user equipment and a base station. For example, the UE 10 may include the capabilities described above for reducing feedback overhead when communicating with the BS 20.

The above examples and modified examples may be combined with each other, and various features of these examples can be combined with each other in various combinations. The invention is not limited to the specific combinations disclosed herein.

Although the disclosure has been described with respect to only a limited number of embodiments, those skilled in the art, having benefit of this disclosure, will appreciate that various other embodiments may be devised without depart-ing from the scope of the present invention. Accordingly, the scope of the invention should be limited only by the attached claims.

What is claimed is:

1. A terminal comprising:
a receiver that receives higher layer signaling;
a processor that determines a precoding matrix indicator (PMI) without port selection, using a matrix, and one or more frequency domain (FD) bases determined based on the higher layer signaling; and
a transmitter that transmits a report of channel state information (CSI) including the PMI,
wherein the matrix is an identity matrix being associated with a two-dimensional spatial domain (SD) beam.

2. A radio communication method for a terminal, com-prising:
receiving higher layer signaling;
determining a precoding matrix indicator (PMI) without port selection, using a matrix, and one or more fre-quency domain (FD) bases determined based on the higher layer signaling; and
transmitting a report of channel state information (CSI) including the PMI,
wherein the matrix is an identity matrix being associated with a two-dimensional spatial domain (SD) beam.

3. A system comprising a terminal and a base station, wherein the terminal comprises:

a receiver that receives higher layer signaling;

a processor that determines a precoding matrix indica- tor (PMI) without port selection, using a matrix, and one or more frequency domain (FD) bases deter- mined based on the higher layer signaling; and a transmitter that transmits a report of channel state information (CSI) including the PMI, wherein the matrix is an identity matrix being associ- ated with a two-dimensional spatial domain (SD) beam, and the base station comprises:

a transmitter that transmits the higher layer signaling; and a receiver that receives the report of the CSI.

\* \* \* \* \*